(12) United States Patent
Badaye et al.

(10) Patent No.: US 9,459,736 B2
(45) Date of Patent: *Oct. 4, 2016

(54) FLEXIBLE CAPACITIVE SENSOR ARRAY

(75) Inventors: Massoud Badaye, Sunnyvale, CA (US);
Greg Landry, Merrimack, NH (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 13/091,132

(22) Filed: Apr. 21, 2011

(65) Prior Publication Data

US 2012/0098783 A1    Apr. 26, 2012

Related U.S. Application Data

(60) Provisional application No. 61/392,034, filed on Oct. 12, 2010.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ...... G06F 3/044; G06F 3/0414; G06F 3/016; G06F 1/1652
USPC ........................................................ 345/174
See application file for complete search history.

(56) References Cited

U.S. PATENT DOCUMENTS

| | | | |
|---|---|---|---|
| 5,149,919 A * | 9/1992 | Greanias et al. ......... | 178/18.02 |
| 5,543,591 A * | 8/1996 | Gillespie et al. ......... | 178/18.03 |
| 6,492,979 B1 * | 12/2002 | Kent et al. ............... | 345/173 |
| 6,661,239 B1 * | 12/2003 | Ozick ....................... | 324/658 |
| 6,940,291 B1 * | 9/2005 | Ozick ....................... | 324/658 |
| 7,030,860 B1 * | 4/2006 | Hsu et al. ................. | 345/173 |
| 7,088,346 B2 * | 8/2006 | Krajewski et al. ........ | 345/173 |
| 7,343,813 B1 * | 3/2008 | Harrington ............... | 73/780 |
| 7,911,456 B2 * | 3/2011 | Gillespie et al. ......... | 345/174 |
| 8,125,463 B2 * | 2/2012 | Hotelling et al. ......... | 345/173 |
| 8,174,509 B2 * | 5/2012 | Liao .................... | G06F 3/044 345/174 |
| 8,363,031 B2 * | 1/2013 | Geaghan ................. | 345/174 |
| 8,599,165 B2 * | 12/2013 | Westhues ............. | G06F 3/0412 345/174 |

(Continued)

FOREIGN PATENT DOCUMENTS

| | | |
|---|---|---|
| EP | 2214082 A1 | 8/2010 |
| WO | WO 2010 019004 A3 | 2/2010 |

OTHER PUBLICATIONS

U.S. Appl. No. 13/247,590: "Force Sensing Capacitive Hybrid Touch Sensor," Massoud Badaye, filed Sep. 28, 2011; 57 pages.
USPTO Advisory Action for U.S. Appl. No. 13/247,590 dated May 1, 2013; 3 pages.
USPTO Advisory Action for U.S. Appl. No. 13/247,590 dated Dec. 9, 2014; 3 pages.

(Continued)

*Primary Examiner* — Temesgh Ghebretinsae
*Assistant Examiner* — Michael J Jansen, II
(74) *Attorney, Agent, or Firm* — Morgan, Lewis & Bockius LLP

(57) ABSTRACT

A method for detecting force applied to a capacitive sensor array and compensating for coordinate inaccuracy due to force includes receiving a plurality of capacitance measurements from the capacitive sensor array, where the plurality of capacitance measurements includes a first capacitance measurement and a second capacitance measurement, and detecting pressure on the capacitive sensor array based on a comparison between the first capacitance measurement and the second capacitance measurement.

17 Claims, 10 Drawing Sheets

(56) References Cited

U.S. PATENT DOCUMENTS

| | | | |
|---|---|---|---|
| 8,711,129 B2* | 4/2014 | Hotelling et al. | 345/178 |
| 2002/0121146 A1* | 9/2002 | Manaresi et al. | 73/862.68 |
| 2003/0067451 A1* | 4/2003 | Tagg et al. | 345/174 |
| 2004/0160235 A1 | 8/2004 | Okada et al. | |
| 2008/0048997 A1* | 2/2008 | Gillespie et al. | 345/174 |
| 2008/0088592 A1* | 4/2008 | Fry | 345/173 |
| 2008/0158175 A1* | 7/2008 | Hotelling et al. | 345/173 |
| 2008/0180399 A1* | 7/2008 | Cheng | 345/173 |
| 2009/0091551 A1* | 4/2009 | Hotelling et al. | 345/174 |
| 2009/0273579 A1 | 11/2009 | Zachut et al. | |
| 2010/0066701 A1* | 3/2010 | Ningrat | 345/174 |
| 2010/0073320 A1 | 3/2010 | Liao et al. | |
| 2010/0073323 A1* | 3/2010 | Geaghan | 345/174 |
| 2010/0097078 A1* | 4/2010 | Philipp et al. | 324/684 |
| 2010/0139991 A1* | 6/2010 | Philipp et al. | 178/18.06 |
| 2010/0231548 A1 | 9/2010 | Mangione-Smith et al. | |
| 2011/0007021 A1* | 1/2011 | Bernstein et al. | 345/174 |
| 2011/0007023 A1* | 1/2011 | Abrahamsson et al. | 345/174 |
| 2011/0141051 A1 | 6/2011 | Ryu | |
| 2011/0273394 A1* | 11/2011 | Young et al. | 345/174 |
| 2012/0038583 A1* | 2/2012 | Westhues et al. | 345/174 |
| 2012/0098783 A1 | 4/2012 | Badaye et al. | |

OTHER PUBLICATIONS

USPTO Final Rejection for U.S. Appl. No. 13/247,590 dated Feb. 13, 2013; 15 pages.

USPTO Final Rejection for U.S. Appl. No. 13/247,590 dated Oct. 1, 2014; 24 pages.

USPTO Final Rejection for U.S. Appl. No. 13/247,590 dated Dec. 30, 2013; 18 pages.

USPTO Non-Final Rejection for U.S. Appl. No. 13/247,590 dated Mar. 10, 2015; 21 pages.

USPTO Non-Final Rejection for U.S. Appl. No. 13/247,590 dated Jul. 24, 2014; 20 pages.

USPTO Non-Final Rejection for U.S. Appl. No. 13/247,590 dated Aug. 15, 2013; 13 pages.

USPTO Non-Final Rejection for U.S. Appl. No. 13/247,590 dated Dec. 11, 2012; 11 pages.

Search Report and Written Opinion of the International Searching Authority for International Application No. PCT/US11/56019 mailed Mar. 7, 2012; 4 pages.

International Search Report and Written Opinion, PCT/US2011/053638, Feb. 17, 2012, 6 pgs.

SIPO Office Action for Application No. CN 201180002806.9, Sep. 12, 2015, 6 pgs.

\* cited by examiner

FLEXIBLE CAPACITIVE SENSOR ARRAY

RELATED APPLICATIONS

This application claims the benefit of U.S. Provisional Application No. 61/392,034, filed on Oct. 12, 2010, which is hereby incorporated by reference.

TECHNICAL FIELD

This disclosure relates to the field of capacitance sensors and, in particular, to a flexible capacitive sensor array.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of one or more conductive objects, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

Figure 1:
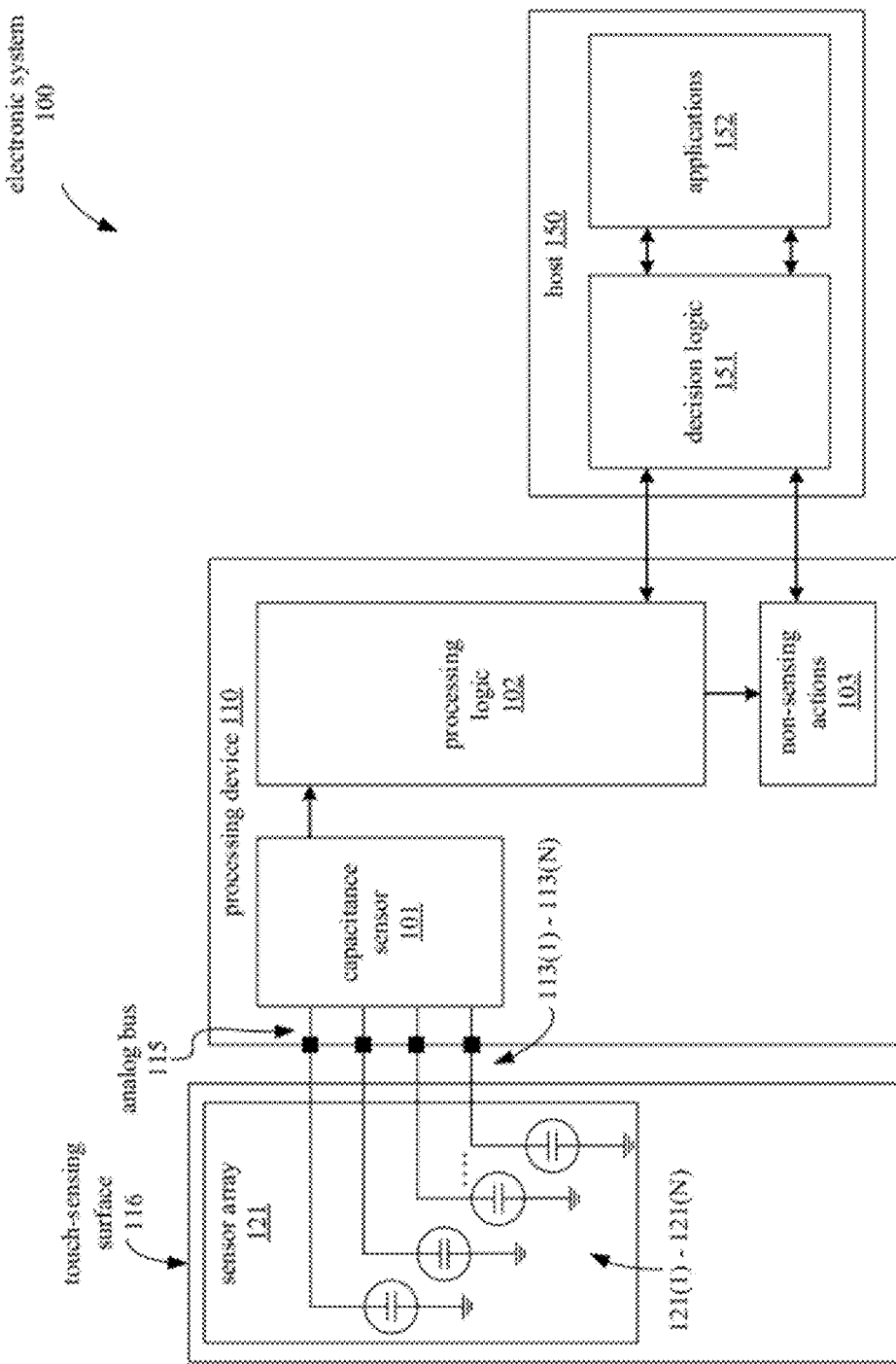
FIG. 1 is a block diagram illustrating an embodiment of an electronic system that processes touch sensor data.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

One embodiment of a flexible touch-sensing surface may include a capacitive sensor array with a highly flexible overlay made of a material such as Poly(methyl methacrylate), or PMMA. In this embodiment, the capacitive sensor array may use a single layer low-cost pattern that is made using a PET substrate and a flexible (e.g., PMMA) overlay without a shield. There is no glass in the sensor stack-up and therefore the sensor is very easy to bend. There are two basic issues when the shield layer is removed in such design. Both issues are related to the ease with which the sensor can bend due to pressure which causes the sensor to approach the LCD that is mounted behind it. The issues caused by bending are: (1) a non-conductive object that bends the screen will cause false touches; and (2) a hard finger press will cause inaccurate coordinates to be reported. In one embodiment, the capacitive sensor array may respond to changes in capacitance resulting from proximity of a conductive object to the capacitive sensor array, or to pressure applied by a conductive or nonconductive object to the surface of the sensor array.

In one embodiment, the flexible touch-sensing surface implemented using a capacitive sensor array may overlay a display panel, such as a liquid crystal display (LCD) screen to implement a touchscreen. In this arrangement, coupling between the sensor electrodes of the capacitive sensor array and the display panel may cause reported touch coordinates to shift substantially in response to pressure on the flexible touch-sensing surface. For example, the two main problems with low-cost single layer sensors with a flexible (e.g., PMMA) overlay without a shield between the sensor and the display panel are coordinate shift due to sensor deflection and false reports due to a non-conductive object touch. In some embodiments, the signal processing methods described herein are used to address both of these problems.

For example, when a conductive object touches the touch-sensing surface without applying pressure, the system reports a first set of touch coordinates indicating the location of the touch. If the conductive object then applies pressure to the touch-sensing surface, the reported touch coordinates may shift towards the center of the capacitive sensor array. A nonconductive object touching the flexible touch-sensing surface may result in no touch being detected; however, if the nonconductive object applies pressure to the touch-sensing surface, the system may detect the pressure as a false touch, which may cause problems if it is not distinguished from an actual touch by a conductive object.

In one embodiment, these effects are caused by displacement of some of the sensor elements of the capacitive sensor array, which may be moved closer to the display panel, thus increasing the capacitive coupling between the display panel and the displaced sensor elements.

One embodiment of a method for compensating for the coordinate shift and false touch effects seen with flexible touch-sensing surfaces includes receiving capacitance measurements from a first and a second sensor element of the capacitive sensor array and detecting whether pressure has been applied to the touch-sensing surface, based on a comparison between the first and second capacitance measurements. The comparison may include, for example, calculating a ratio of the first and second capacitance measurements and detecting the pressure when the ratio exceeds a threshold.

A processing device implementing the above method may receive the first and second capacitance measurements at a capacitive sensor input, then detect the presence of pressure applied to the touch-sensing surface based on the comparison between the first and second capacitance measurements. In one embodiment, the processing device may further calculate touch coordinates indicating a location of the touch at the touch-sensing surface, and transmit the touch coordinates to a host for further processing.

FIG. 1 illustrates a block diagram of one embodiment of an electronic system 100 including a processing device 110 that may be configured to measure capacitances from a flexible touch-sensing surface and compensate for coordinate shifting and false touch effects. The electronic system 100 includes a touch-sensing surface 116 (e.g., a touchscreen, or a touch pad) coupled to the processing device 110 and a host 150. In one embodiment, the touch-sensing surface 116 is a two-dimensional user interface that uses a sensor array 121 to detect touches on the surface 116.

In one embodiment, the sensor array 121 includes sensor elements 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In this embodiment, each sensor element 121(1)-121(N) is represented as a capacitor. The self capacitance of each sensor in the sensor array 121 is measured by a capacitance sensor 101 in the processing device 110.

In one embodiment, the capacitance sensor 101 may include a relaxation oscillator or other means to convert a capacitance into a measured value. The capacitance sensor 101 may also include a counter or timer to measure the oscillator output. The capacitance sensor 101 may further include software components to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over or under a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), where the object is detected on the sensor array (e.g., determining the location of the object), tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
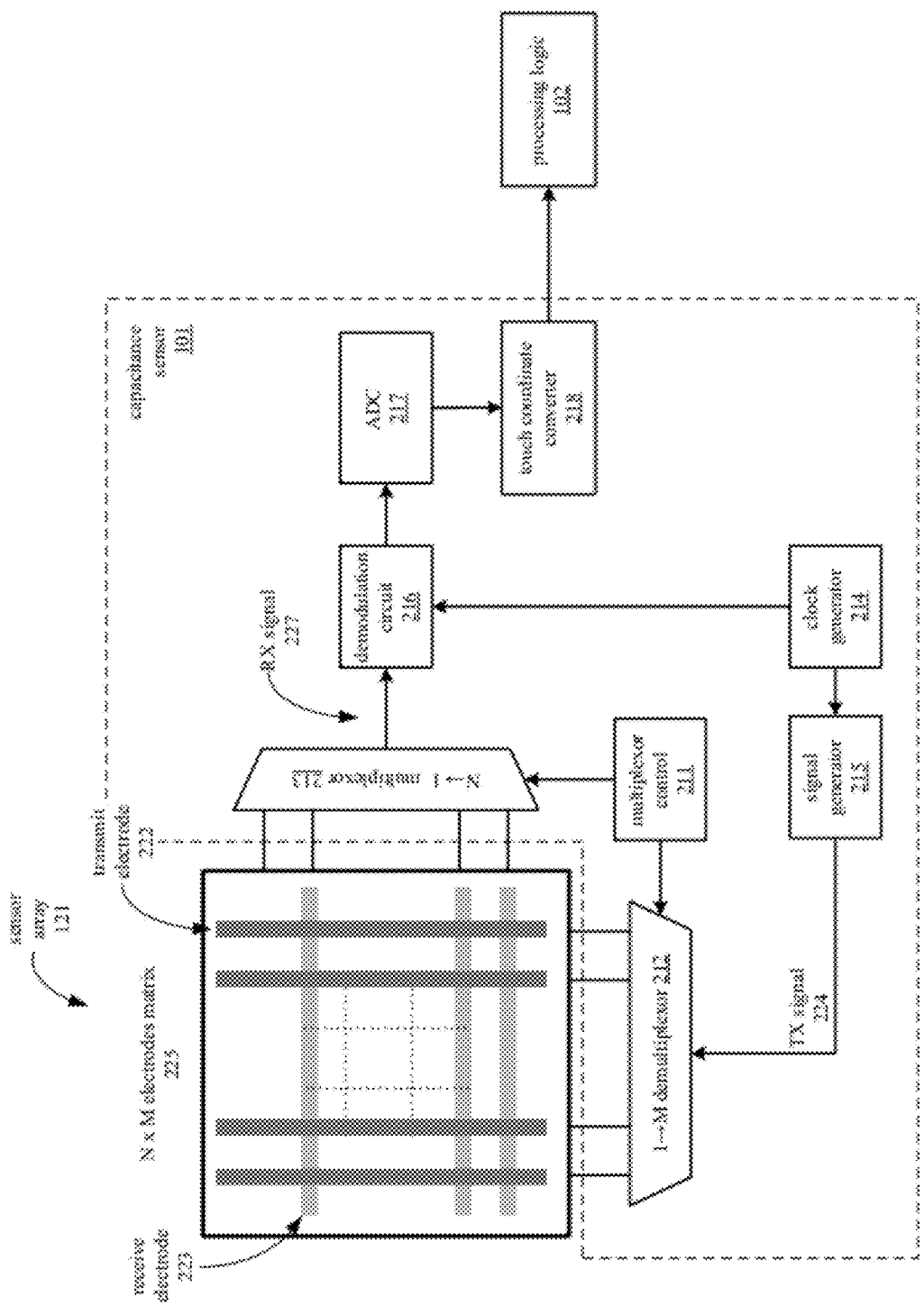
FIG. 2 is a block diagram illustrating an embodiment of an electronic system that processes touch sensor data.

FIG. 2 is a block diagram illustrating one embodiment of a capacitive touch sensor array 121 and a capacitance sensor 101 that converts measured capacitances to coordinates. The coordinates are calculated based on measured capacitances. In one embodiment, sensor array 121 and capacitance sensor 101 are implemented in a system such as electronic system 100. Sensor array 121 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 201 through demultiplexer 212 and multiplexer 213.

Capacitance sensor 101 includes multiplexer control 211, demultiplexer 212 and multiplexer 213, clock generator 214, signal generator 215, demodulation circuit 216, and analog to digital converter (ADC) 217. ADC 217 is further coupled with touch coordinate converter 218. Touch coordinate converter 218 outputs a signal to the processing logic 102.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of touch sensor 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with demultiplexer 212, which allows the TX signal 224 to be applied to any of the M transmit electrodes of touch sensor 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied.

Because of the capacitive coupling between the transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with each intersection between a TX electrode and an RX electrode can be sensed by selecting every available combination of TX electrode and an RX electrode using demultiplexer 212 and multiplexer 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When an object, such as a finger, approaches the electrode matrix 225, the object causes a decrease in the mutual capacitance between only some of the electrodes. For example, if a finger is placed near the intersection of transmit electrode 222 and receive electrode 223, the presence of the finger will decrease the mutual capacitance between electrodes 222 and 223. Thus, the location of the finger on the touchpad can be determined by identifying the one or more receive electrodes having a decreased mutual capacitance in addition to identifying the transmit electrode to which the TX signal 224 was applied at the time the decreased mutual capacitance was measured on the one or more receive electrodes.

By determining the mutual capacitances associated with each intersection of electrodes in the matrix 225, the locations of one or more touch contacts may be determined. The determination may be sequential, in parallel, or may occur more frequently at commonly used electrodes.

In alternative embodiments, other methods for detecting the presence of a finger or conductive object may be used where the finger or conductive object causes an increase in capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined from the locations of one or more electrodes at which an increased capacitance is detected.

The induced current signal 227 is rectified by demodulation circuit 216. The rectified current output by demodulation circuit 216 can then be filtered and converted to a digital code by ADC 217.

The digital code is converted to touch coordinates indicating a position of an input on touch sensor array 121 by touch coordinate converter 218. The touch coordinates are transmitted as an input signal to the processing logic 102. In one embodiment, the input signal is received at an input to the processing logic 102. In one embodiment, the input may be configured to receive capacitance measurements indicating a plurality of row coordinates and a plurality of column coordinates. Alternatively, the input may be configured to receive row coordinates and column coordinates.

Figure 3:
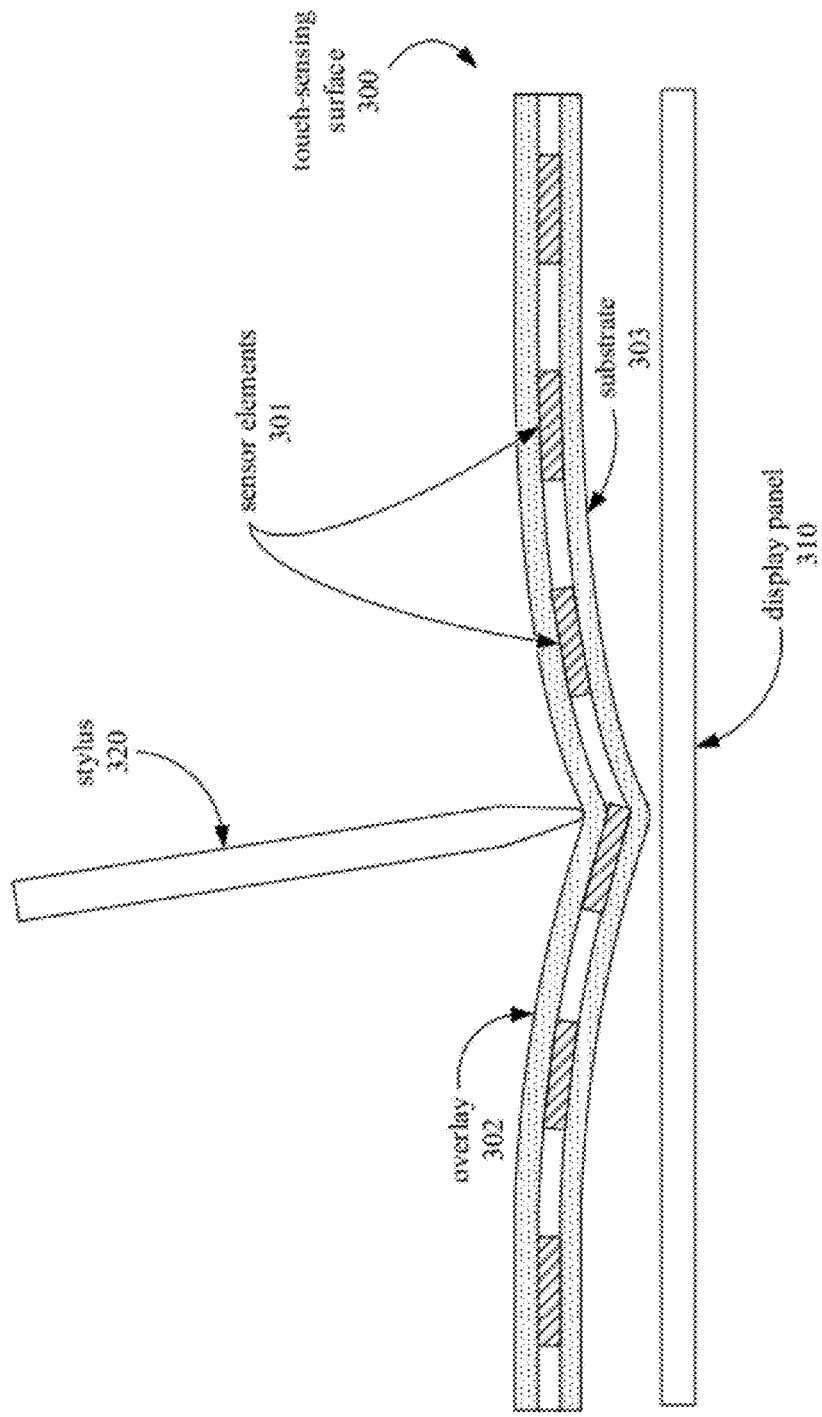
FIG. 3 illustrates a profile view of a flexible touch-sensing surface, according to an embodiment.

FIG. 3 illustrates one embodiment of a flexible touch-sensing surface 300 that may be connected to a capacitance sensor such as capacitance sensor 101. Touch-sensing surface 300 includes a number of sensor elements 301 that may be part of a capacitive sensor array such as sensor array 121, as illustrated in FIG. 2.

Touch-sensing surface 300 includes the sensor elements 301 formed on a substrate 303 and covered by an overlay 302. In one embodiment, the substrate 303 is made from a material such as Polyethylene terephthalate (PET). In one embodiment, the substrate 303 is flexible and transparent. The layer of sensor elements 301 may be additionally covered with an overlay 302, which may be manufactured from a material such as PMMA. In one embodiment, the overlay 302 is also flexible and transparent. The flexible touch-sensing surface 300 overlays a display panel 310, which may be a LCD display, LED display, OLED display, or some other type of display panel. As illustrated in FIG. 3, there is no shield layer between substrate 303 and display panel 310.

As illustrated in FIG. 3, pressure may be applied to the touch-sensing surface 300 by an object such as stylus 320. The pressure applied by the stylus 320 displaces the sensor elements 301 such that sensor elements nearer to the location where the pressure is applied are pushed closer to the display panel. As illustrated in FIG. 3, the displacement of the sensor elements is exaggerated for clarity. In the following description, the terms "force" and "pressure" may be used interchangeably to describe a condition that causes displacement of sensor elements or deformation of the touch-sensing surface or sensor array.

Figure 4:
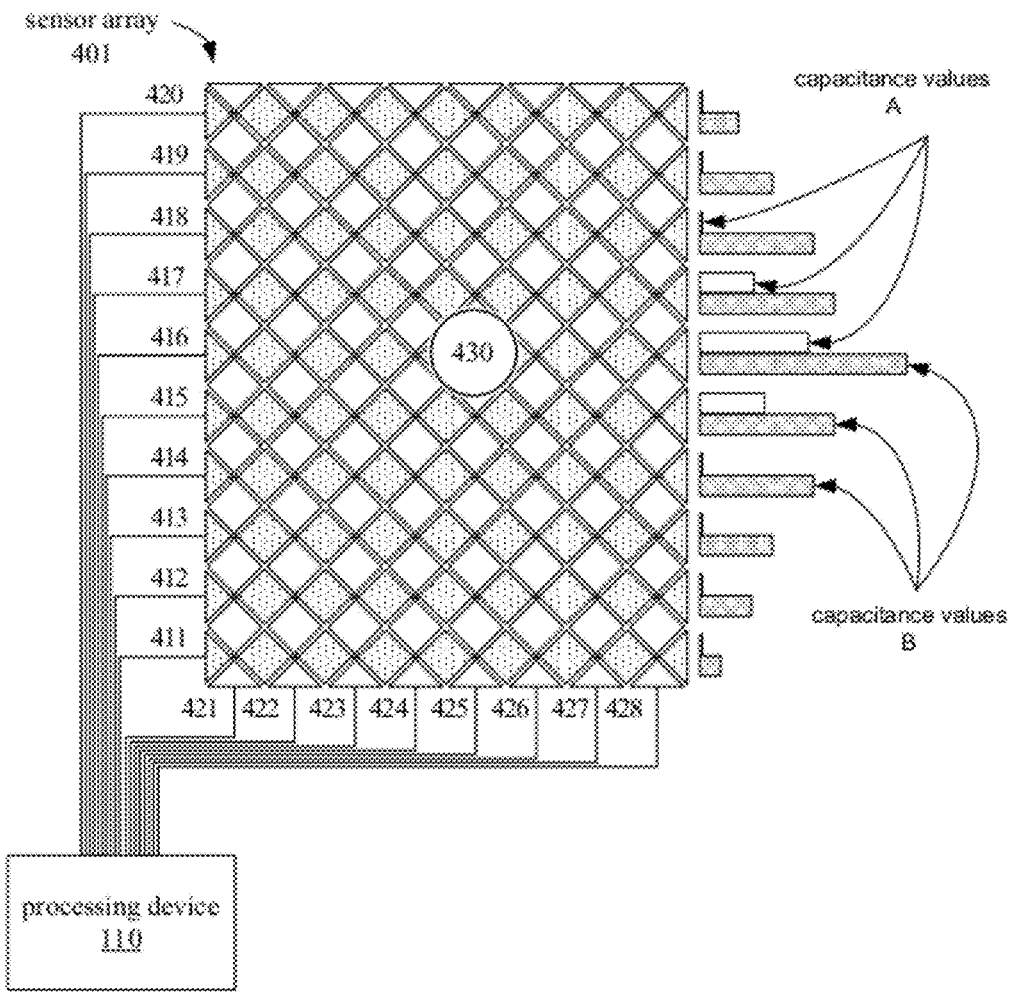
FIG. 4 illustrates an embodiment of a capacitive sensor array.

The deflection of some of the sensor elements 301 can result in an increase in the signal strengths measured by an ADC such as ADC 217. FIG. 4 illustrates a sensor array 401 of a flexible touch-sensing surface that includes row sensor elements 411-420 and column sensor elements 421-428. The row and column sensor elements 411-428 are connected to a processing device 110, which measures capacitance values from each of the sensor elements 411-428. In one embodiment, the capacitance values A (unshaded bars) represent capacitance values measured from the row sensor elements 411-420 when a contact 430 by a conductive object is near or touching the sensor array 401, but is not exerting force on the sensor array 401 and is not deforming sensor array 401. Capacitance values B (shaded bars) represent capacitance values measured from the row sensor elements 411-420 when the conductive object additionally exerts a force deforming the sensor array at contact location 430. Individual capacitance values from sets A and B are referenced according to the sensor elements from which they are measured, i.e., capacitance measurement 416A or 416B from row element 416.

The set of capacitance values A illustrates that a contact 430 that does not apply force to the sensor array 401 and does not displace the sensor elements 411-428 results in a sharper drop in magnitude of the capacitance signal farther away from the center of contact 430. In contrast, the set of capacitance values B resulting from an object applying force to the sensor array 401 at contact 430 illustrates a more gradual drop in magnitude of the capacitance signals farther from the center of contact 430, which is caused by the displacement of the sensor elements near the contact 430.

Thus, in one embodiment, the contact 430 from a conductive object not applying force results in a sharper profile, while the contact 430 from an object applying force and deforming the sensor array results in a wider, flatter profile. In some cases, even a nonconductive object applying force at contact location 430 may sufficiently increase the capacitance signals B such that a false touch is detected.

In one embodiment, a processing device such as processing device 110 that is connected to a capacitive sensor array 401 may detect deformation caused by pressure on the sensor array 401 based on a comparison between a first capacitance measurement and a second capacitance measurement from the set of capacitance measurements taken from the row elements (or column elements) of sensor array 401. In one embodiment, the capacitance measurement with the highest magnitude may be selected as the first capacitance value, while the second capacitance value may be chosen the nth strongest capacitance signal, where n is a predetermined integer. Alternatively, the second capacitance value may be measured from a sensor element that is a predetermined distance from the first capacitance value. For example, a first capacitance value 416A may be compared with a second value 419A.

In one embodiment, a profile ratio between the first and second capacitance values may be calculated, and an amount of force applied to the sensor elements or an amount of sensor deformation or displacement of the sensor elements may be inferred based on the profile ratio. For example, a profile ratio below a specific profile ratio threshold may be used to indicate that excessive force is being applied to the sensor array 401, and may trigger a compensation process for maintaining accuracy of the reported touch-coordinates. In one embodiment, the compensation may be performed by the processing device 110.

In one embodiment, the compensation process avoids false touch reports caused by force applied by non-conductive objects based on a shape of the capacitance measurement profile. Since deformation of the sensor array resulting from force applied by a non-conductive object causes a wider profile (smaller drop-off farther from the contact) when compared to a narrow profile (larger drop-off farther from the contact) caused by a conductive object, a shape of the profile may be used to distinguish the cases.

For example, a ratio that characterizes the shape of the profile may be calculated using Equation 1 below:

$$\text{profile\_ratio} = \frac{C_{peak}}{C_n} \quad \text{(Equation 1)}$$

In one embodiment, $C_{peak}$ is the first capacitance value, having the highest magnitude, while $C_n$ is the second capacitance value, which is chosen such that $C_n$ is the nth strongest signal. For example, for n=4, and when signal 416A is the first capacitance value $C_{peak}$, signal 418A may be chosen as the second capacitance value $C_n$, since 418A is the 4$^{th}$ strongest capacitance value. Alternatively, $C_n$ may be a capacitance signal corresponding to a sensor element n elements away from the sensor element corresponding to the first capacitance value. For example, for n=4, and while 416A is chosen as the first capacitance value $C_{peak}$, 412A or 420A may be chosen as the second capacitive value $C_n$.

In one embodiment, the value for n may be chosen such that a capacitance value that is affected by the sensor element displacement, and that is less affected by proximity of a conductive object is chosen as the second capacitance value. The value for n may be determined empirically by comparing profiles caused by conductive contacts and nonconductive contacts that apply force. The value of n may also differ based on the pitch of the sensor elements in sensor array 401.

In one embodiment, if a non-conductive object applies force to the sensor array 401 at a high speed, the first few profiles may have profile ratios that are comparable to those that may be caused by a conductive contact that does not apply force. This may cause difficulty in distinguishing between the conductive and non-conductive contacts. To resolve this problem, a debouncing technique may be implemented so that a number of initial sampled profiles may be discarded. For example, the first one or two profiles sampled after detecting the initial contact may be discarded so that the touching object settles to its normal profile.

In response to receiving an apparent touch at the touch-sensing surface, one embodiment of a compensation process may determine based on the profile whether the touch is caused by a conductive object near or contacting the surface, or caused by a non-conductive object applying force to the surface. If the apparent touch is caused by a non-conductive object applying force to the surface, the compensation process may discard the apparent touch input or assert a signal indicating to a host that the apparent touch is caused by a non-conductive object.

In one embodiment, a compensation process may be initiated in response to detecting that a force is being applied to the touch-sensing surface resulting in deformation that may cause inaccuracies in the reported touch coordinates. One embodiment of such a compensation process may cease calculation of touch coordinates when the force is detected. For example, when a conductive object applies pressure to the touch sensing surface, the processing device 110 may detect that force is being applied and cease calculation of new touch coordinates. Thus, the inaccurate touch coordinates (which are affected by the applied force) are not reported to the host.

In one embodiment, during the time that no new touch coordinates are being reported to the host, the processing device 110 may report a set of default touch coordinates to the host. For example, the default touch coordinates may be a set of "last known" coordinates, which is the last set of touch coordinates calculated before initiation of the compensation process.

In one embodiment, the processing device 110 may resume normal calculation and reporting of the touch coordinates to the host in response to detecting that the force applied to the touch-sensor is no longer being applied. For example, the processing device 110 may determine that the force is no longer applied when the profile ratio no longer exceeds the predetermined profile ratio threshold.

Figure 5:
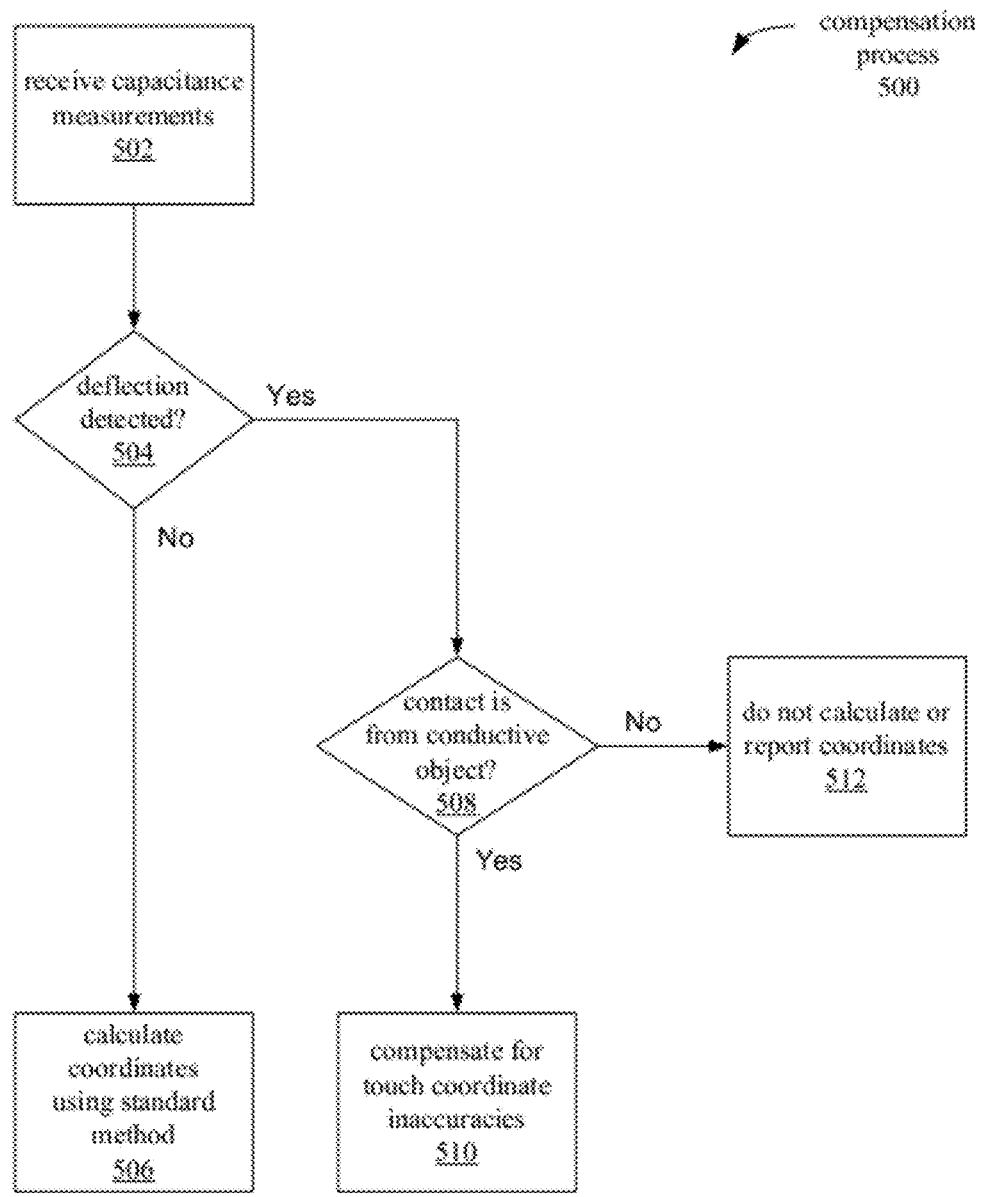
FIG. 5 is a flow diagram illustrating a process for compensating for force effects at a touch-sensing surface, according to an embodiment.

FIG. 5 is a flow diagram illustrating one embodiment of a process 500 for compensating for force effects on a flexible touch-sensing surface. One embodiment of compensation process 500 may be performed in a processing device, such as processing device 110, as illustrated in FIG. 4.

At block 502, the processing device receives capacitance measurements from the capacitive sensor array, such as sensor array 401. From block 502, the process 500 continues at block 504.

At block 504, the processing device determines whether the sensor elements of the sensor array have been displaced. In one embodiment, the processing device determines a profile ratio based on a first and a second capacitance measurement of the capacitance measurements received at block 502. If, at block 504, the processing device determines that the sensor elements are not being deflected, the process 500 continues at block 506, where, the processing device may calculate touch coordinates using a standard method.

If, at block 504, the processing device determines that the sensor elements are being deflected, for example, as a result of force applied to the touch-sensing surface, the process 500 continues at block 508. At block 508, the processing device determines whether the contact represented in the capacitive measurements received at block 502 are caused by proximity or touch of a conductive object. If the touch is from a conductive object, the process 500 continues at block 510. Otherwise, if the touch is from a non-conductive object, the process 500 continues at block 512, where no new touch coordinates are calculated or reported.

The process 500 arrives at block 510 when the touch-sensing surface has been contacted by a conductive object that is applying force to the touch-sensing surface, displacing the sensor elements and possibly leading to inaccurate touch coordinates. Thus, at block 510, the processing device may compensate for touch-coordinate inaccuracies caused by force applied to the touch-sensing surface. For example, one method for compensation may include reporting the last known coordinates of the touch to the host, which may be the last set of coordinates that was calculated. In an alternative embodiment, the processing device may report some other set of default coordinates or may interpolate replacement coordinates to replace the inaccurate coordinates.

Another alternative embodiment of a compensation process may determine an amount of each capacitance value that is attributable to the applied force and subtract it from the raw set of capacitance signals. For example, for a given set of capacitance values measured from the sensor array, a portion of each signal may be attributable to the proximity or contact of a conductive object, while the remainder of the signal may be attributable to a force applied by the conductive object that causes displacement of the sensor elements. One method for compensating for coordinate shift due to the applied force may determine the amount of signal that is attributable to the force, then subtract this amount from the capacitance signals.

In one embodiment, the processing element may access a lookup table that stores one or more compensation profiles. Each of the compensation profiles in the lookup table stores sets of correction values that can be used to adjust the measured raw capacitance values from the sensor array. In response to detecting displacement of the sensor elements due to force, the processing element may calculate a corrected touch location based on one of the compensation profiles, which may be determined based on the amount of force detected.

In one embodiment, a compensation profile may be modeled using a general equation that most closely fits the shape of the profile. In one embodiment, the set of capacitance values resulting when a force is applied by a non-conductive object results in a profile that can be modeled using a quadratic formula. The shape of the profile of capacitance values B, as illustrated in FIG. 4, for instance, may be modeled using a quadratic curve. Thus, a set of compensation values may be generated based on the quadratic formula, and each of the compensation values may be subtracted from its corresponding measured raw capacitance value to generate a set of corrected capacitance values more closely approximating the values that would have resulted had force not been applied to the sensor array.

In one embodiment, the quadratic compensation profile is determined based on at least a first and a second point (Ppeak, Pn) of the curve, and the position of the peak. For example, in a system where the $4^{th}$ largest capacitance value has significant magnitude only when the sensor elements are displaced by force, the 4$^{th}$ largest capacitance value may be chosen as the second point Pn. Generally, the second point may be chosen to be a point that is affected by force, but is not affected by the proximity of a conductive object applying the force. Hereafter, n is assumed to be 4; however the value of n may differ in other embodiments. Ppeak is also assumed to be $P_1$, which is the signal having the highest magnitude.

In one embodiment, Ppeak and Pn values may be gathered empirically by applying a known force to the touch-sensing surface using a non-conductive object. The applied force may result in a set of capacitance values similar to capacitance values B, as illustrated in FIG. 4, having a flatter profile. The capacitance signal with the highest magnitude may be stored as $P_1$, while the 4th strongest signal is stored as $P_4$. In one embodiment, the ($P_4$, $P_1$) values may be measured for 16 points associated with known (x,y) locations on the touch-sensing surface. This set of 16 ($P_4$, $P_1$) values may constitute one layer of a 3 dimensional (3D) correction table.

Figure 6:
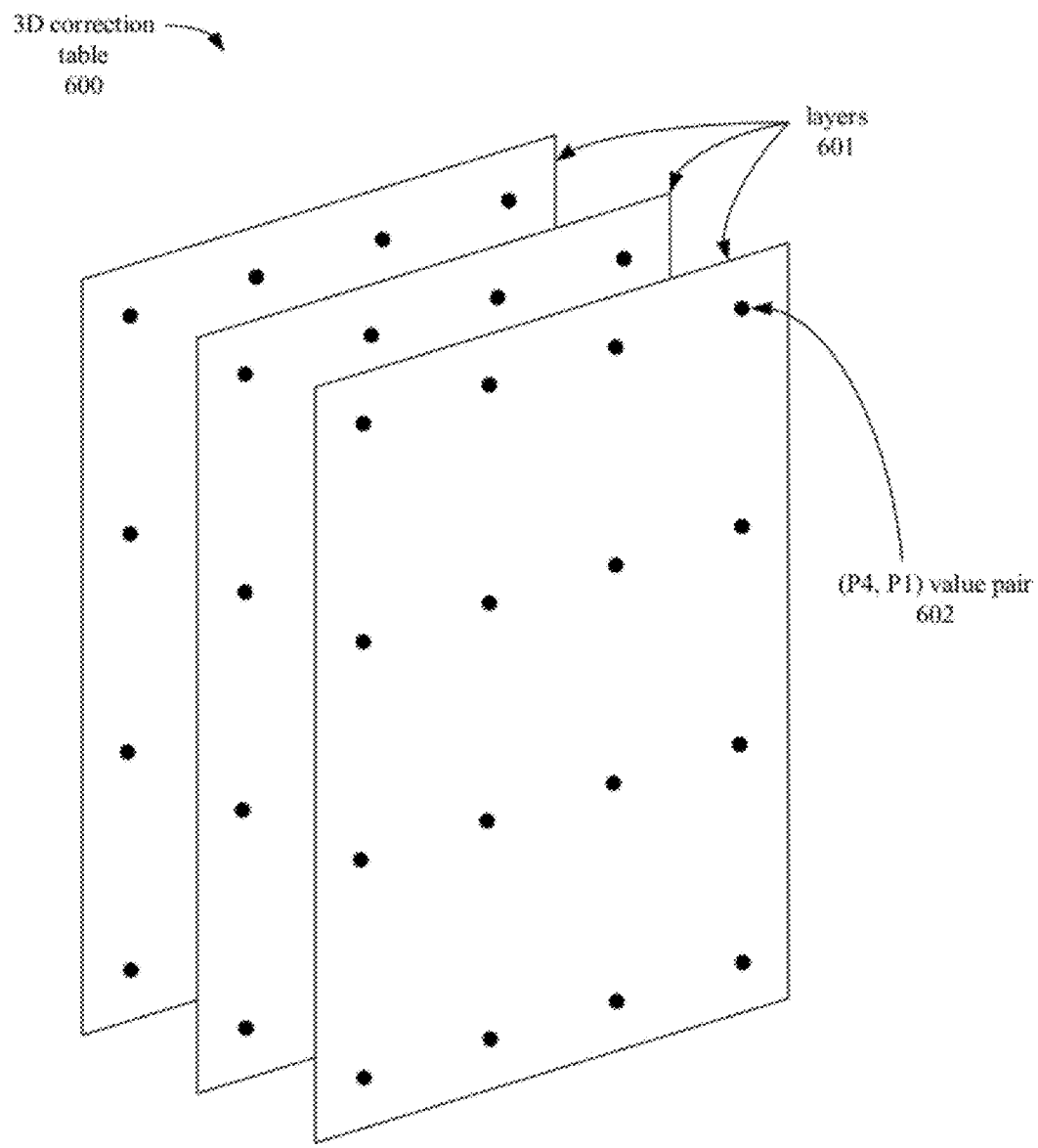
FIG. 6 illustrates a three-dimensional (3D) correction table, according to an embodiment.

FIG. 6 illustrates an embodiment of a 3D correction table 600 having 16 sets of ($P_4$, $P_1$) values such as value pair 602 for each layer 601. Each layer of 3D correction table 600 represents an amount of force that may be applied to the touch-sensing surface. For example, when determining the values in the correction table 600 empirically, each of the values in the same layer may have been determined by applying the same amount of force to the touch-sensing surface.

In one embodiment, the 3D correction table 600 may store, for each of the 16 points, more values in addition to the 1$^{st}$ and 4$^{th}$ largest values $P_1$ and $P_4$. This may consume more memory space, but may decrease the amount of computation required and time required to perform the compensation.

In one such alternative embodiment that stores more values in addition to $P_4$ and $P_1$, only the top n values may be stored. For example, the values $P_1$, $P_2$, $P_3$, and $P_4$ may be stored, representing the four values having the highest magnitude. In one embodiment, any sensor element having a value less than the top n sensors may be given a corrected value of 0, based on the assumption that any signal on those sensors is completely attributable to displacement of the sensor elements and not from the proximity of a conductive object. This system may decrease accuracy of the compensation, but may also reduce the amount of data storage used, as compared to storing all of the values.

In one embodiment, the 16 ($P_4$, $P_1$) value pairs may correspond to intersections in the sensor array. Alternatively, the value pairs may only be stored for some intersections of sensor elements, or may be stored for other points distributed across the surface of the sensor array that are not associated with an intersection. In one embodiment, fewer or more than 16 value pairs are stored in each layer. A 3D correction table may also include fewer or more than 3 layers.

Figure 7:
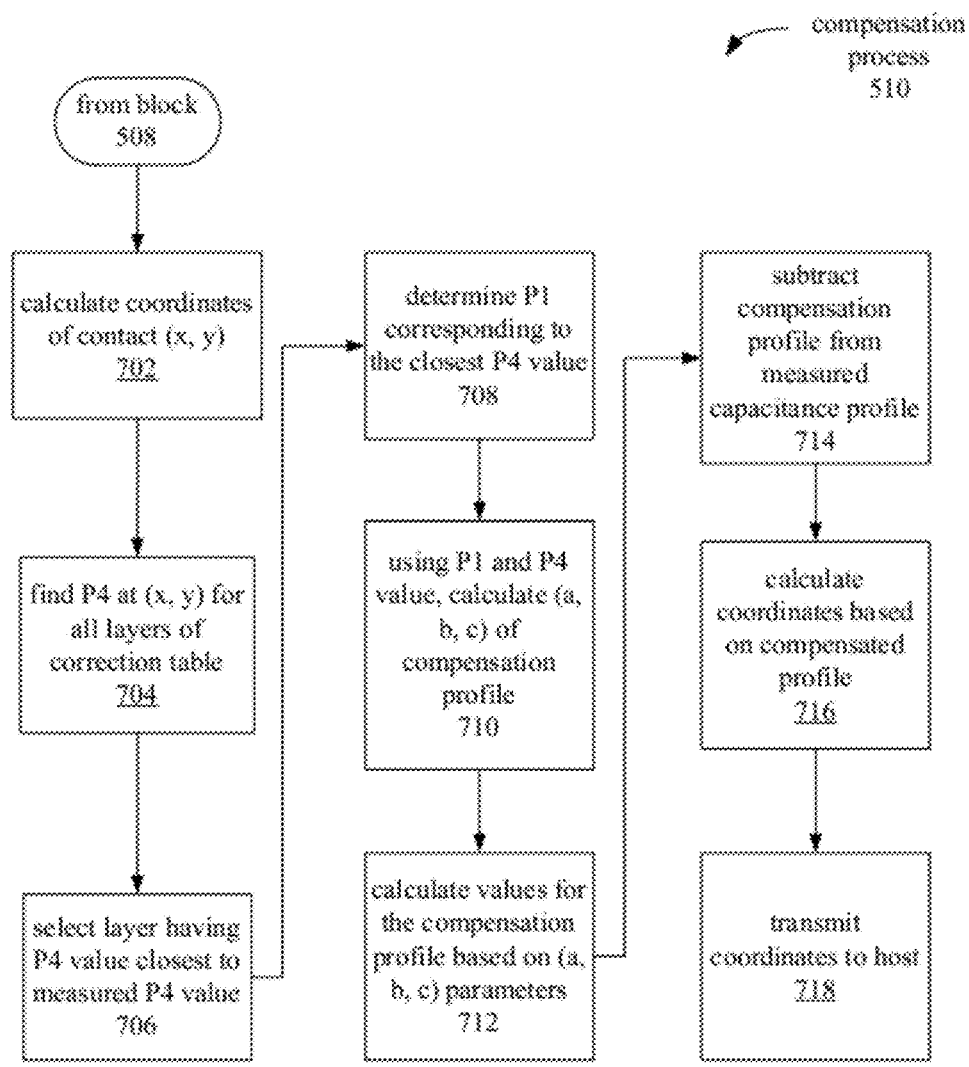
FIG. 7 is a flow diagram illustrating a process for compensating for force effects at a touch-sensing surface, according to an embodiment.

FIG. 7 is a flow diagram illustrating one embodiment of a compensation process 510 that compensates for the effects of force applied to a capacitive touch-sensing surface using a 3D correction table such as table 600 illustrated in FIG. 6. In one embodiment, the operations performed during compensation process 510 correspond to block 510, as illustrated in FIG. 5. In one embodiment, the process 510 may also be performed by a processing device such as processing device 110. Compensation process 510 may determine a set of compensation values (approximated as a quadratic curve) based on two points ($P_4$, $P_1$) of the quadratic curve and a location (x, y) of a peak of the quadratic curve.

At block 702 of process 510, when a finger or other conductive object is present at the touch-sensing surface, the capacitance signals are measured and touch coordinates (x, y) are calculated. From block 702, the process 510 continues at block 704.

At block 704, the value for $P_4$ corresponding to the measured touch location (x, y) is retrieved from each layer of the 3D correction table. From block 704, the process 510 continues at block 706.

At block 706, the processing device may select a $P_4$ value that is closest to the measured $P_4$ value for the location (x, y). At block 708, the processing device determines the $P_1$ value associated with the selected $P_4$ value. Once the values for $P_4$ and $P_1$ are known, the processing device may calculate parameters of the compensation profile, as provided at block 710. In one embodiment, the parameters a, b, and c are constants in a quadratic formula.

Figure 8:
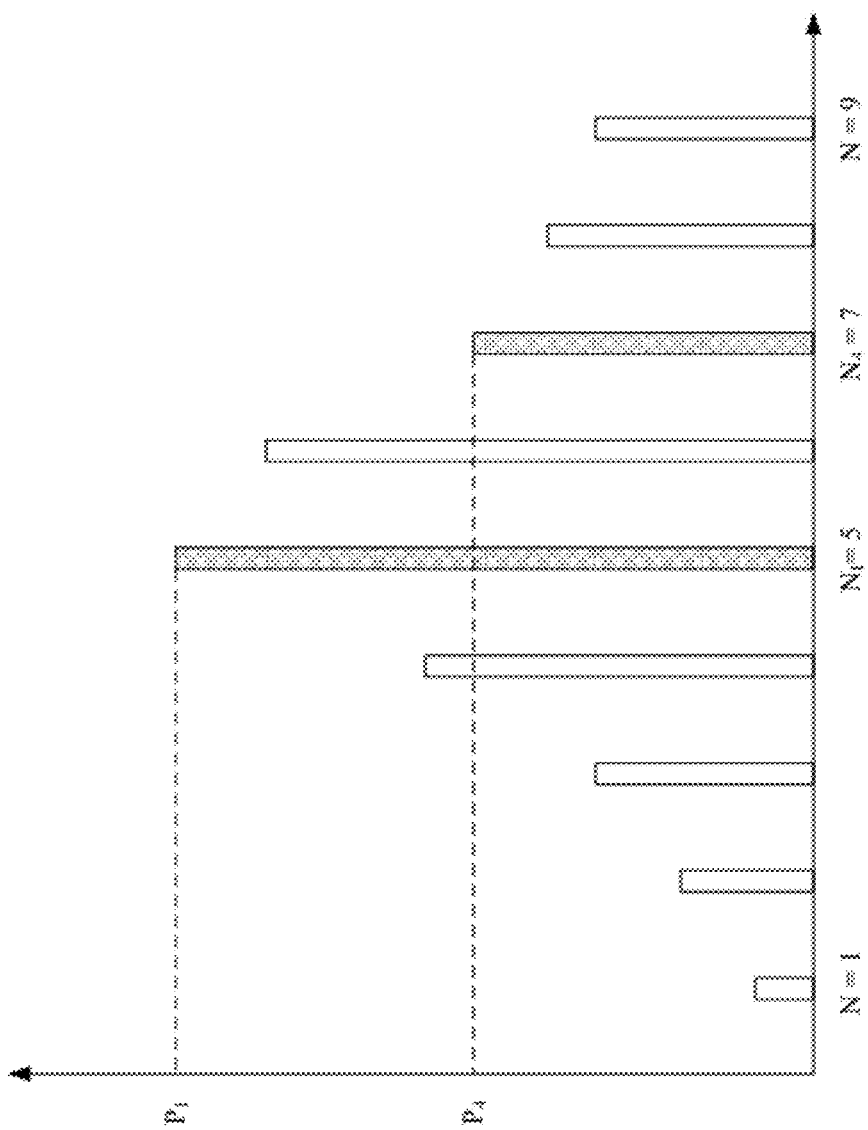
FIG. 8 illustrates a set of capacitance values, according to an embodiment.

Once the values of $P_1$ and $P_4$ are obtained, it is possible to derive the equation of the quadratic curve using the values of $P_1$ and $P_4$ and their corresponding channel indices. In one embodiment, a channel index is a sequential number used to identify each sensor element in the sensor array. For example, each sensor element in a row or column may be numbered sequentially with a channel index. Thus, the channel index may represent the location of the sensor element along an axis. FIG. 8 illustrates a set of measured capacitance values, according to one embodiment. In FIG. 8, channel indices $N_1$ and $N_4$ correspond to values $P_1$ and $P_4$, respectively. Here, $P_1$ is measured from the 5$^{th}$ sensor element so that $N_1$ equals 5. Accordingly, $N_4$ is equal to 7.

In one embodiment, Equations 2-5 below may be used to determine the parameters a, b, and c of a quadratic equation for approximating the compensation profile for one axis of a sensor array (i.e., either the rows or columns). In Equation 2, P represents a compensation value, and n represents a position along the sensor array axis. Thus Equation 2 may be used to determine a compensation value that can be subtracted from a raw capacitance value measured from a sensor element at location n along the sensor array axis.

$$P = an^2 + bn + c \qquad \text{(Equation 2)}$$

$$a = \frac{P_4 - P_1}{(N_4 - N_1)^2} \qquad \text{(Equation 3)}$$

$$b = -2aN_1 \qquad \text{(Equation 4)}$$

$$c = P_1 + aN_1^2 \qquad \text{(Equation 5)}$$

Referring again to FIG. 7, Equations 2-5 may be used by the processing device to calculate values a, b, and c for the quadratic equation describing the compensation profile, as provided at block 710. From block 710, the process 510 continues at block 712.

At block 712, the processing device calculates a set of compensation values using the quadratic equation with the values a, b, and c determined at block 710. In one embodiment, a compensation value corresponding to a sensor element may be determined using the channel index N of the sensor element in the quadratic equation (i.e., as n in Equation 2). In one embodiment, the processing device may calculate a compensation value for each of the capacitance values measured from the sensor elements of the sensor array.

At block 714, the compensation values are subtracted from their corresponding measured capacitance values to generate a set of compensated capacitance values. From block 714, the process 510 continues at block 716.

At block 716, the processing device calculates coordinates of the touch based on the set of compensated capacitance values. The processing device then transmits the calculated touch coordinates to a host device, as provided at block 718.

Figure 9:
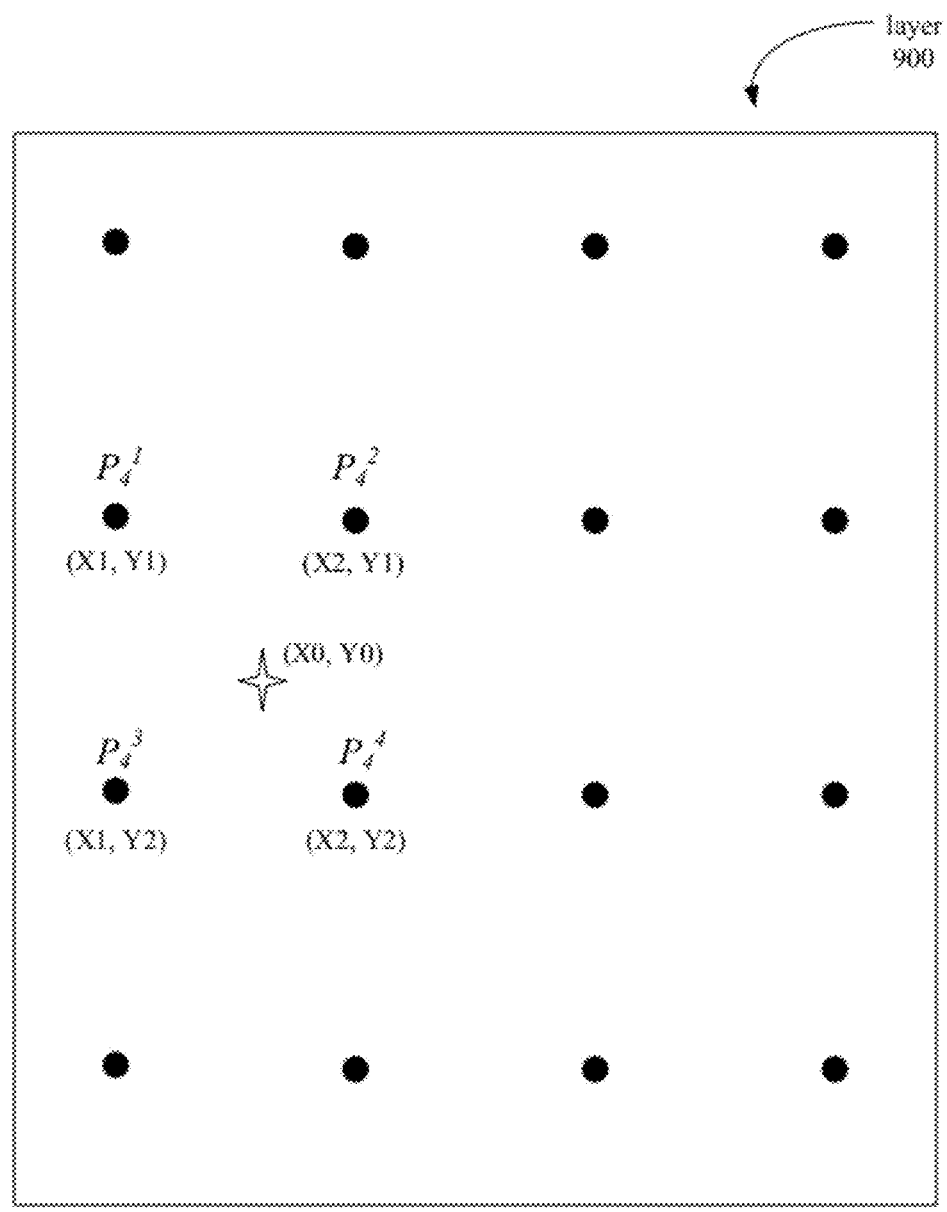
FIG. 9 illustrates a layer of a 3D correction table, according to an embodiment.

In one embodiment, the compensation process may obtain a more accurate set of compensation values by interpolating between the stored values in the 3D correction table. FIG. 9 illustrates a layer of the 3D correction table, according to one embodiment. With reference to FIG. 9, for a contact location at coordinates (X0, Y0) indicated by a star, interpolation may be used to compute the value of $P_4$ using 2D interpolation.

Once the interpolated value of $P_4$ has been determined, the compensation process may include further interpolation of the $P_4$ value in between the nearest $P_4$ values stored in the layers 601 of the 3D correction table 600 in order to determine a value for $P_1$.

Referring again to FIG. 9, (X0, Y0) may indicate a first attempt at coordinate calculation based on the raw uncorrected capacitance values measured from the sensor array. The point (X0, Y0) is located between the four points having coordinates (X1, Y1), (X2, Y1), (X1, Y2), and (X2, Y2). The measured value of $P_4$ on these points are $P_4^1$, $P_4^2$, $P_4^3$, and $P_4^4$, respectively. In one embodiment, an estimate of $P_4$ at (X0, Y0) is calculated by averaging the four measured $P_4$ values in the table that surround the point (X0, Y0).

In an alternative embodiment, an approximation of $P_4$ may be obtained by performing a 2D linear interpolation between these points. The four points (X1, Y1, $P_4^1$), (X2, Y1, $P_4^2$), (X1, Y2, $P_4^3$), and (X2, Y2, $P_4^4$) may be considered as being on a plane described by Equation 6 below:

$$P = AX + BY + C \qquad \text{(Equation 6)}$$

Equation 6 designates a plane in XYP space, where A, B and C are constants. The parameters A, B, and C may be determined using three of the points (X1, Y1, $P_4^1$), (X2, Y1, $P_4^2$), and (X1, Y2, $P_4^3$). Plugging the three coordinates in Equation 6 yields Equations 7-9 below:

$$P_4^1 = AX1 + BY1 + C \qquad \text{(Equation 7)}$$

$$P_4^2 = AX2 + BY1 + C \qquad \text{(Equation 8)}$$

$$P_4^3 = AX1 + BY2 + C \qquad \text{(Equation 9)}$$

Subtracting Equation 7 from Equation 8 yields Equation 10 below:

$$A = \frac{P_4^2 - P_4^1}{X2 - X1} \qquad \text{(Equation 10)}$$

Subtracting Equation 7 from Equation 9 yields Equation 11 below:

$$B = \frac{P_4^3 - P_4^1}{Y2 - Y1} \qquad \text{(Equation 11)}$$

Equations 10, 11, and 7 may be used to solve for C. Thus, the general form of the plane equation for any point on layer 900, such as (X0, Y0) as indicated in FIG. 9, is expressed by Equation 12:

$$P_4^0 = \frac{P_4^2 - P_4^1}{X2 - X1}(X0 - X1) + \frac{P_4^3 - P_4^1}{Y2 - Y1}(Y0 - Y1) + P_4^1 \qquad \text{(Equation 12)}$$

To obtain an estimate of $P_4$ at (X0, Y0) Equation 12 may be used to compute $P_4$ for all layers of the 3D correction table. A layer having a $P_4$ value closest to the measured $P_4$ value may be selected, and Equation 12 may be used to determine the $P_1$ value for the coordinate (X0, Y0), where $P_4$ values are replaced by $P_1$ values, as expressed in Equation 13:

$$P_1^0 = \frac{P_1^2 - P_1^1}{X2 - X1}(X0 - X1) + \frac{P_1^3 - P_1^1}{Y2 - Y1}(Y0 - Y1) + P_1^1 \qquad \text{(Equation 13)}$$

Figure 10:
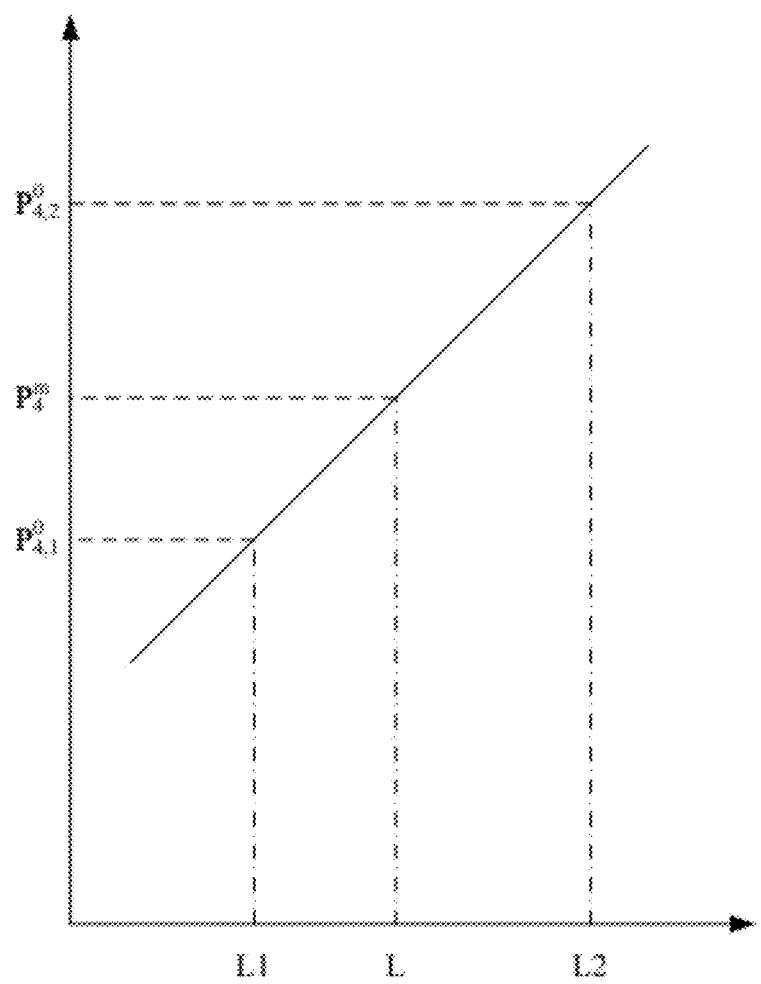
FIG. 10 is a graph illustrating interpolation between layers of a 3D correction table, according to an embodiment.

In one embodiment, inter-layer interpolation may also be used to obtain an estimate of the $P_1$ value. For example, the measured $P_4$ for the position (X0, Y0) may be between the $P_4$ values of a first layer (layer 1) and a second layer (layer 2); $P_{4,1}^0$ and $P_{4,2}^0$ may represent the respective $P_4$ values computed from layer 1, and layer 2 at (X0, Y0) point, and $P_4^m$ is the measured $P_4$ value. The value of L, as illustrated in FIG. 10 corresponds to an index of an interpolated layer that would have given the exact value of the measured $P_4$, had layer L been included in the 3D correction table. The value of L can be calculated from the line equation illustrated in FIG. 10, expressed below as Equation 14:

$$L = \frac{P_4^m - P_{4,1}^0}{P_{4,2}^0 - P_{4,1}^0}(L2 - L1) + L1 \qquad \text{(Equation 14)}$$

In FIG. 10, L1 and L2 are the indices of layers 1 and 2, respectively. In one embodiment, the value L may be used to obtain a value of $P_1^0$ (the peak value of the compensation values) from interpolation between layers 1 and 2. Replacing $P_{4,L}^0$ with $P_{1,L}^0$ in Equation (14) (where L in the subscript is the layer number) yields the following Equation 15 to calculate the interpolated value of $P_1^0$:

$$P_1^0 = \frac{P_{1,2}^0 - P_{1,1}^0}{L2 - L1}(L - L1) + P_{1,1}^0 \qquad \text{(Equation 15)}$$

Equation 14 shows the layer position for an interpolated layer that would have the same value as the $P_4$ measured at (X0, Y0). Substituting L from Equation 14 into Equation 15 results in Equations 16 below:

$$P_1^0 = \frac{(P_{1,2}^0 - P_{1,1}^0)(P_4^m - P_{4,1}^0)}{P_{4,2}^0 - P_{4,1}^0} + P_{1,1}^0 \qquad \text{(Equation 16)}$$

Thus, $P_1^0$ is the interpolated value that approximates the peak signal due to deflection of sensor elements that can be used along with the measured $P_4$ to calculate a, b, and c parameters of a quadratic equation. Equation 16 involves computation of four values, i.e., $P_{4,2}^0$, $P_{4,1}^0$, $P_{1,2}^0$, and $P_{1,1}^0$, from Equations 12 and 13. The more general form of Equation 16 is shown by Equation 17, where all layer indices in Equation 16 are replaced by parameters L1 and L2.

$$P_1^0 = \frac{(P_{1,L2}^0 - P_{1,L1}^0)(P_4^m - P_{4,L1}^0)}{P_{4,L2}^0 - P_{4,L1}^0} + P_{1,L1}^0 \qquad \text{(Equation 16)}$$

In this case the measured value of $P_4^m$ follows the inequality relation expressed in Equation 18:

$$P_{4,L2}^0 \geq P_4^m \geq P_{4,L1}^0 \qquad \text{(Equation 17)}$$

In one embodiment, the processing device may apply the above compensation process to all capacitance measurements without first determining whether force has been applied to the touch-sensing surface, or whether any sensor elements have been displaced. For example, with reference to FIG. 5, the process 500 may proceed from block 502 directly to block 510. In one embodiment, the layers 601 of a 3D correction table 600 may include a layer with baseline values of $P_4$ that are referenced when there is no signal attributable to force.

In one embodiment, rather than using a 3D correction table storing predetermined values, a compensation process may use a formula or function that uses one or more of the measured capacitance values to determine magnitudes of the capacitance signals attributable to sensor element displacement.

In one embodiment, the method of looking up values in the 3D correction table may also be used to determine an amount of displacement of the sensor elements, or the amount of bending or deformation of the touch-sensing panel due to force.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
  receiving a plurality of capacitance measurements from a plurality of sensor elements of a capacitive sensor array, wherein the plurality of capacitance measurements includes a first capacitance measurement measured by a first sensor element of the capacitive sensor array and
  a second capacitance measurement measured by a second sensor element of the capacitive sensor array, wherein the second sensor element is within a same set of rows or columns separated by a predetermined distance from the first sensor element;
  wherein a flexible touch-sensing surface includes a flexible overlay, a flexible substrate, and the plurality of sensor elements of the capacitive sensor array, the plurality of sensor elements being positioned between the flexible substrate and the flexible overlay;
  wherein the flexible touch-sensing surface overlays a display panel without a shield layer being provided against capacitive coupling between the plurality of sensor elements and the display panel;
  determining whether deformation of the flexible touch-sensing surface is detected based on a comparison between the first capacitance measurement being a highest magnitude value of the plurality of capacitance measurements and the second capacitance measurement being a second magnitude value;
  when the deformation is not detected, calculating a touch location based on the plurality of capacitance measurements; and
  when the deformation is detected, compensating for touch coordinate inaccuracies caused by the deformation.

2. The method of claim 1, wherein the comparison comprises determining a ratio between the first capacitance measurement and the second capacitance measurement.

3. The method of claim 1, wherein the comparison comprises determining a difference between the first capacitance measurement and the second capacitance measurement.

4. The method of claim 1, wherein the plurality of capacitance measurements indicate the touch location of a contact at the touch-sensing surface, and wherein the first capacitance measurement corresponds to a first sensor element closer to the contact than a second sensor element corresponding to the second capacitance measurement.

5. The method of claim 4, wherein at least two sensor elements are situated between a sensor element corresponding to the second capacitance measurement and a sensor element corresponding to the first capacitance measurement.

6. The method of claim 1, further comprising selecting the second capacitance measurement based on a magnitude of the second capacitance measurement relative to magnitudes of the other capacitance measurements.

7. The method of claim 1, further comprising selecting the second capacitance measurement based on a distance between a first sensor element corresponding to the first capacitance measurement and a second sensor element corresponding to the second capacitance measurement.

8. The method of claim 1, further comprising:
  transmitting the touch location; and
  in response to detecting the deformation, stopping calculation of the touch location.

9. The method of claim 8, wherein compensating for the touch coordinate inaccuracies comprises, in response to detecting the deformation, transmitting a last known touch location.

10. The method of claim 8, wherein the plurality of capacitance measurements is acquired during a transient time period following a touch at the touch-sensing surface and a stable time period following the transient time period, and wherein the calculation of the touch location is performed based on a subset of the plurality of capacitance measurements acquired during the stable time period.

11. The method of claim 1, wherein compensating for the touch coordinate inaccuracies comprises, in response to detecting the deformation, calculating a corrected touch location based on a magnitude of the detected deformation.

12. The method of claim 11, wherein calculating the corrected touch location comprises:
identifying a compensation profile corresponding to the detected deformation; and
calculating a corrected measurement for each of the plurality of capacitance measurements based on the compensation profile.

13. An apparatus, comprising:
a flexible touch-sensing surface including a flexible overlay, a flexible substrate, and a plurality of sensor elements of a capacitive sensor array, the plurality of sensor elements being positioned between the flexible substrate and the flexible overlay;
wherein the flexible touch-sensing surface overlays a display panel without a shield layer being provided against capacitive coupling between the plurality of sensor elements and the display panel;
a capacitive sensor input configured to receive a plurality of capacitance measurements from the capacitive sensor array, wherein the plurality of capacitance measurements includes a first capacitance measurement from a first sensor element of the capacitive sensor array and a second capacitance measurement from a second sensor element of the capacitive sensor array, wherein the second sensor element is within a same set of rows or columns separated by a predetermined distance from the first sensor element; and
a processing unit coupled with the capacitive sensor input, wherein the processing unit is configured to:
determine whether deformation of the flexible touch-sensing surface is detected based on a comparison between the first capacitance measurement being a highest magnitude value of the plurality of capacitance measurements and the second capacitance measurement being a second magnitude value;
when the deformation is not detected, calculate a touch location based on the plurality of capacitance measurements; and
when the deformation is detected, compensate for touch coordinate inaccuracies caused by the deformation.

14. The apparatus of claim 13, wherein the processing unit performs the comparison by calculating a ratio between the first capacitance measurement and the second capacitance measurement.

15. The apparatus of claim 13, further comprising a lookup table coupled with the processing unit, wherein the lookup table is configured to store at least one compensation profile, and wherein the processing unit is further configured to, in response to detecting the deformation, calculate a corrected touch location based on the at least one compensation profile.

16. An apparatus, comprising:
a flexible touch-sensing surface including a flexible overlay, a flexible substrate, and
an array of sensor elements, the array of sensor elements being positioned between the flexible substrate and the flexible overlay;
wherein the flexible touch-sensing surface overlays a display panel without a shield layer being provided against capacitive coupling between the array of sensor elements and the display panel;
a capacitance sensor coupled with the array of sensor elements, wherein the capacitance sensor is configured to take a plurality of capacitance measurements from the array of sensor elements, wherein the plurality of capacitance measurements includes a first capacitance measurement from a first sensor element of the array of sensor elements and a second capacitance measurement from a second sensor element of the array of sensor elements, and wherein the second sensor element is within a same set of rows or columns separated by a predetermined distance from the first sensor element;
a processing logic coupled with the capacitance sensor, wherein the processing logic is configured to:
determine whether deformation of the flexible touch-sensing surface is detected based on a comparison between the first capacitance measurement being a highest magnitude value of the plurality of capacitance measurements and the second capacitance measurement being a second magnitude value;
when the deformation is not detected, calculate a touch location based on the plurality of capacitance measurements; and
when the deformation is detected, compensate for touch coordinate inaccuracies caused by the deformation.

17. The apparatus of claim 16, wherein the processing logic is further configured to transmit a last known touch location to a host in response to detecting the deformation.

* * * * *